(12) United States Patent
Hu et al.

(10) Patent No.: US 8,979,326 B2
(45) Date of Patent: Mar. 17, 2015

(54) LENS AND LED MODULE USING THE SAME

(71) Applicant: Hon Hai Precision Industry Co., Ltd., New Taipei (TW)

(72) Inventors: Chau-Jin Hu, New Taipei (TW); Li-Ying Wang He, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/972,862

(22) Filed: Aug. 21, 2013

(65) Prior Publication Data

US 2015/0029728 A1 Jan. 29, 2015

(30) Foreign Application Priority Data

Jul. 26, 2013 (TW) .............................. 102126866 A

(51) Int. Cl.
*F21V 5/00* (2006.01)
*F21K 99/00* (2010.01)
*F21V 5/04* (2006.01)

(52) U.S. Cl.
CPC .... *F21K 9/50* (2013.01); *F21V 5/04* (2013.01)
USPC ........................ 362/311.02; 362/308; 362/309

(58) Field of Classification Search
USPC ...................... 362/311.02, 308, 309
See application file for complete search history.

(56) References Cited

U.S. PATENT DOCUMENTS

| | | | |
|---|---|---|---|
| 7,789,537 B2 * | 9/2010 | Yu et al. | 362/326 |
| 7,922,366 B2 * | 4/2011 | Li | 362/304 |
| 7,959,328 B2 * | 6/2011 | Wanninger | 362/309 |
| 8,419,232 B2 * | 4/2013 | Minano et al. | 362/328 |
| 8,727,581 B2 * | 5/2014 | Saccomanno | 362/336 |
| 2012/0250308 A1 * | 10/2012 | Zwak et al. | 362/235 |
| 2013/0342096 A1 * | 12/2013 | Keller et al. | 313/111 |
| 2014/0240991 A1 * | 8/2014 | Aslanov et al. | 362/299 |

* cited by examiner

*Primary Examiner* — Ali Alavi
(74) *Attorney, Agent, or Firm* — Novak Druce Connolly Bove + Quigg LLP

(57) ABSTRACT

A lens includes a bottom face, a light incident face formed in the bottom face, a light emerging face opposite to the bottom face and a lateral face formed between the bottom face and the light emerging face. A light diverging protrusion is formed on the light incident face. The light diverging protrusion has a conical face gradually shrinking away from the light emerging face. An LED unit incorporating the lens is also disclosed.

17 Claims, 4 Drawing Sheets

LENS AND LED MODULE USING THE SAME

BACKGROUND

1. Technical Field

The disclosure generally relates to lenses, and more particularly to a lens having a light diverging protrusion and an LED (light emitting diode) unit incorporating the lens.

2. Description of Related Art

Nowadays LEDs (light emitting diodes) are applied widely in various applications for illumination. The LED is a highly pointed light source. Thus, light directly emitted from the LED may form a small light spot. However, many occasions require uniform illumination. The small light spot directly produced from the LED cannot meet the uniform illumination requirement.

What is needed, therefore, is a lens and an LED unit using the lens which can address the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the various views.

DETAILED DESCRIPTION

Figure 1:
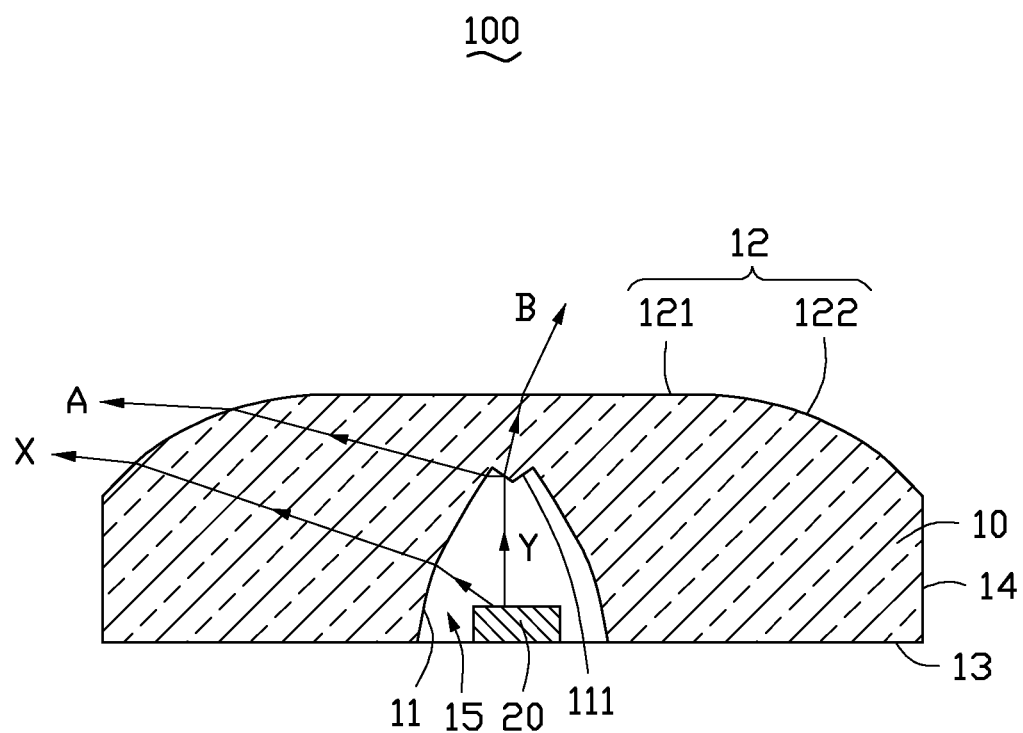
FIG. 1 shows an LED unit in accordance with an embodiment of the present disclosure.

Referring to FIG. 1, an LED (light emitting diode) unit 100 in accordance with an embodiment of the present disclosure is shown. The LED unit 100 includes an LED 20 and a lens 10 mounted above the LED 20.

Figure 2:
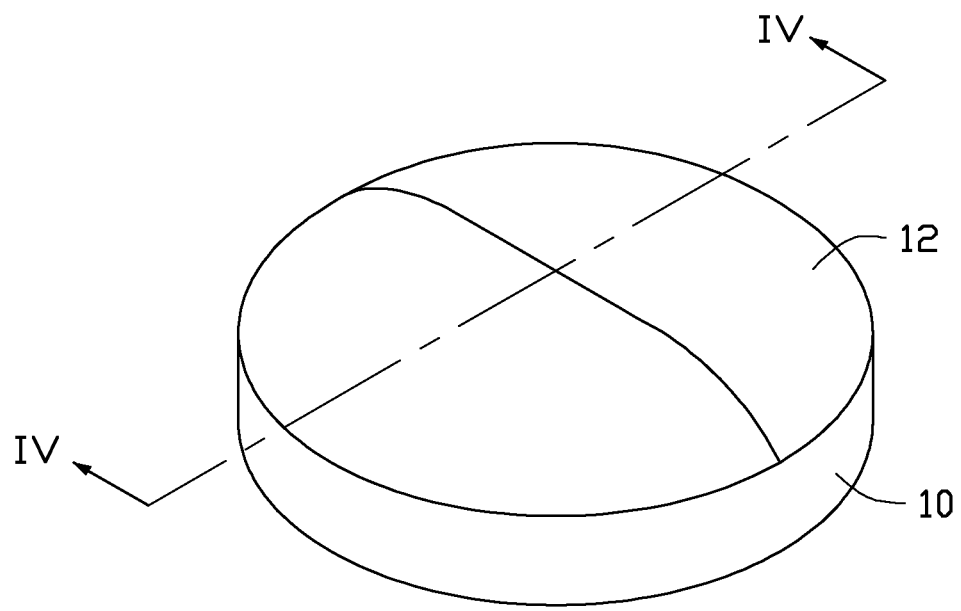
FIG. 2 shows a lens of the LED unit of FIG. 1.
Figure 3:
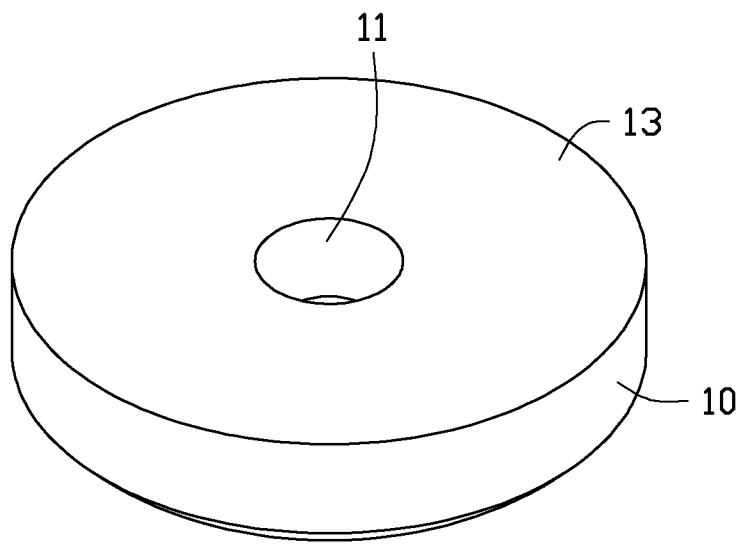
FIG. 3 shows an inverted view of the lens of FIG. 2.
Figure 4:
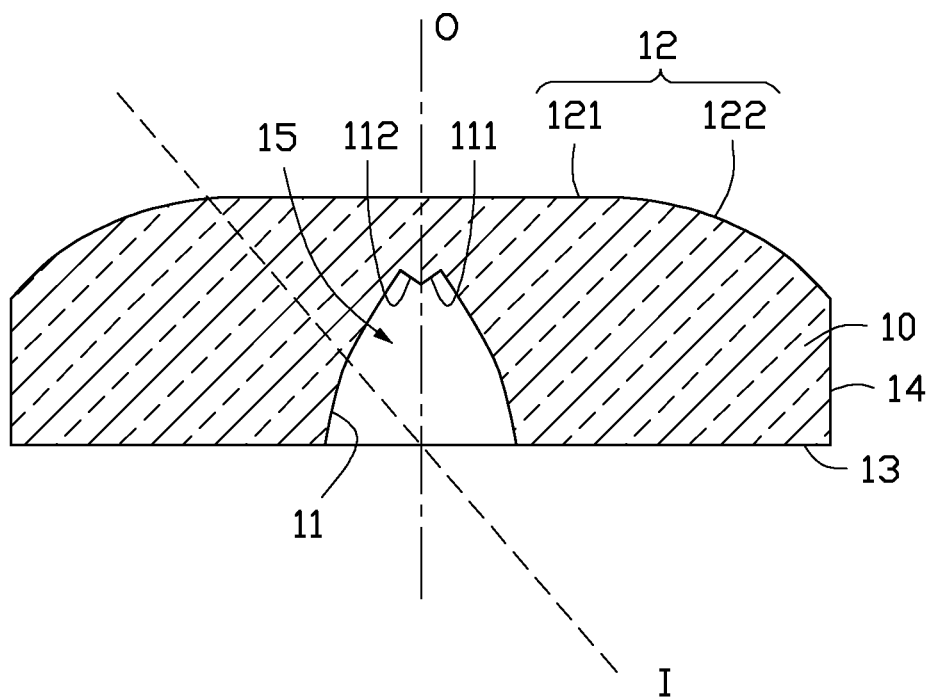
FIG. 4 shows a cross section of the lens of FIG. 2 taken along line IV-IV thereof.

Also referring to FIGS. 2-4, the lens 10 may be made of transparent material such as glass, epoxy, silicone or the like. The lens 10 includes a bottom face 13, a light incident face 11 formed in the bottom face 13, a light emerging face 12 and a lateral face 14 connecting the bottom face 13 with the light emerging face 12. The bottom face 13 is an annular face. The bottom face 13 defines a cavity 15 in a central area thereof. The cavity 15 has a diameter gradually decreasing from the bottom face 13 towards the light emerging face 12. An inner face of the lens 10 defining the cavity 15 forms the light incident face 11 of the lens 10. An optical axis O of the lens 10 extends through a center of the light incident face 11. The cavity 15 is used to receive the LED 20 therein.

A light diverging protrusion 111 is formed on the light incident face 11. The light diverging protrusion 111 protrudes from the light incident face 11 in a direction away from the light emerging face 12. In this embodiment, the light diverging protrusion 111 is a cone having a diameter gradually decreasing from the light incident face 11 towards the bottom face 13 of the lens 10. A bottom tip of the light diverging protrusion 111 is located at the optical axis O of the lens 10. An outside face of the light diverging protrusion 111 forms a light reflecting and refracting face 112 inclined relative to the optical axis O of the lens 10.

The light emerging face 12 includes a flat face 121 and a curved face 122 surrounding the flat face 121. In this embodiment, the flat face 121 is a circular face located adjust above the light incident face 11. The flat face 121 is parallel to the bottom face 13. The curved face 122 directly interconnects the flat face 121 with the lateral face 14, wherein the curved face 122 smoothly connects the flat face 121, and abruptly connects the lateral face 14. The curved face 122 has a diameter gradually increasing from the flat face 121 towards the lateral face 14. An imaginary line I connects a center of the bottom face 13 and a boundary between the flat face 121 and the curved face 122, wherein the imaginary line I is deviated at an angle of 45 degrees from the optical axis O of the lens 10.

The lateral face 14 interconnects the curved face 122 and the bottom face 13. The lateral face 14 is perpendicular to the bottom face 13. The lateral face 14 surrounds the light incident face 11.

The LED 20 is placed in the cavity 15 and faces the light diverging protrusion 111. The LED 20 may be made of GaN, InGaN, AlInGaN or other semiconductor material. The LED 20 can emit light when being powered. A part of the light emitted from the LED 20 with a large light emerging angle (such as light X shown in FIG. 1), is refracted by the incident face 11 and the curved face 122, thereby being diverged out of the lens 10. Another part of the light emitted from the LED 20 with a small light emerging angle (such as light Y shown in FIG. 1), strikes the light reflecting and refracting face 112 of the light diverging protrusion 111, and is then reflected to a first part of light (such as light A shown in FIG. 1) and refracted to a second part of light (such as light B shown in FIG. 1) by the light diverging protrusion 111. The first part of light transmits towards a lateral side of the light incident face 11, and is then refracted by the light incident face 11 and the curved face 122 to be diverged out of the lens 10. The second part of light is refracted by the light diverging protrusion 111 towards an opposite lateral side of the light incident face 11, and is further refracted by the flat face 121 of the light emerging face 12 to be diverged out of the lens 10. Thus, the light emitted from the LED 20 is modulated by the lens 10 to have a uniform distribution, wherein a central area of the light distribution has an intensity approximate to that of a peripheral area of the light distribution. The LED unit 100 is particularly suitable for use in a backlight module for illuminating a display.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A lens comprising:

a light incident face; and a light emerging face opposite to the light incident face; and a light diverging protrusion formed on the light incident face;

wherein the light diverging protrusion has a light reflecting face inclined relative to an optical axis extending through the light incident face and the light emerging face;

the light incident face encloses a cavity in the lens, the light diverging protrusion being received in the cavity; and the lens comprises a bottom face opposite to the light emerging face, the cavity being defined in a central area of the bottom face.

2. The lens of claim 1, wherein the light reflecting face is also a light refracting face.

3. The lens of claim 1, wherein the light diverging protrusion is conical.

4. The lens of claim 1, wherein the light diverging protrusion has a diameter gradually decreasing in a direction away from the light emerging face.

5. The lens of claim 1, wherein the light emerging face comprises a flat face located above the light incident face and a curved face surrounding the flat face.

6. The lens of claim 5, wherein the curved face smoothly connects the flat face.

7. The lens of claim 5, wherein the lens comprises a lateral face interconnecting the light emerging face and the bottom face.

8. The lens of claim 7, wherein the curved face abruptly connects the lateral face.

9. The lens of claim 7, wherein the curved face has a diameter gradually increasing from the flat face towards the lateral face.

10. The lens of claim 7, wherein the lateral face is perpendicular to the bottom face, and the flat face is parallel to the bottom face.

11. An LED (light emitting diode) unit comprising:
   an LED; and
   a lens covering the LED, the lens comprising:
     a light incident face;
     a light emerging face opposite to the light incident face; and
     a light diverging protrusion protruding from the light incident face towards the LED, the light diverging protrusion having a conical outside face gradually shrinking from the light incident face towards the LED;
   the lens comprises a bottom face opposite to the light emerging face, a cavity being defined in the bottom face.

12. The LED unit of claim 11, wherein the light diverging protrusion is located at a top of the cavity away from the bottom face.

13. The LED unit of claim 11, wherein the LED is received in the cavity.

14. The LED unit of claim 11, wherein the light emerging face comprises a flat face and a curved face surrounding the flat face, the flat face being parallel to the bottom face.

15. The LED unit of claim 14, wherein the lens comprises a lateral face interconnecting the bottom face and the curved face, a junction between the curved face and the flat face being smooth, and a junction between the curved face and the lateral face being abrupt.

16. The LED unit of claim 15, wherein the lateral face is perpendicular to the bottom face.

17. The LED unit of claim 11, wherein the lens comprises an optical axis extending through a center of the light diverging protrusion.

\* \* \* \* \*